(12) United States Patent
Robertson

(10) Patent No.: US 9,230,084 B2
(45) Date of Patent: Jan. 5, 2016

(54) METHOD AND SYSTEM FOR ENABLING SECURE ONE-TIME PASSWORD AUTHENTICATION

(71) Applicant: James A. Robertson, The Woodlands, TX (US)

(72) Inventor: James A. Robertson, The Woodlands, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 23 days.

(21) Appl. No.: 13/658,558

(22) Filed: Oct. 23, 2012

(65) Prior Publication Data

US 2014/0115341 A1 Apr. 24, 2014

(51) Int. Cl.
*G06F 12/14* (2006.01)
*G06F 21/34* (2013.01)
*H04L 9/32* (2006.01)
*G06F 21/30* (2013.01)
*H04L 29/06* (2006.01)

(52) U.S. Cl.
CPC ............... *G06F 21/34* (2013.01); *G06F 21/30* (2013.01); *H04L 9/3228* (2013.01); *H04L 63/0838* (2013.01); *G06F 2221/2137* (2013.01); *H04L 63/0846* (2013.01)

(58) Field of Classification Search
CPC ... H04L 63/0846; H04L 9/00; H04L 63/0838; H04L 9/3228; G06F 21/31; G06F 21/34; G06F 21/30; G06F 2221/2137
See application file for complete search history.

(56) References Cited

U.S. PATENT DOCUMENTS

| | | | |
|---|---|---|---|
| 2007/0245010 A1* | 10/2007 | Arn et al. | 709/223 |
| 2008/0034216 A1* | 2/2008 | Law | 713/183 |
| 2009/0080650 A1* | 3/2009 | Selgas et al. | 380/44 |
| 2009/0100261 A1* | 4/2009 | Aoshima | 713/155 |
| 2009/0249076 A1* | 10/2009 | Reed et al. | 713/181 |
| 2011/0218962 A1* | 9/2011 | Vinay et al. | 707/610 |
| 2011/0317837 A1* | 12/2011 | Smith | 380/259 |
| 2012/0072718 A1* | 3/2012 | Ronda et al. | 713/156 |
| 2012/0246463 A1* | 9/2012 | Shea et al. | 713/153 |
| 2012/0311321 A1* | 12/2012 | Landrock et al. | 713/155 |
| 2013/0156184 A1* | 6/2013 | Selgas et al. | 380/44 |

* cited by examiner

*Primary Examiner* — Matthew Smithers

(57) ABSTRACT

An approach for facilitating a one-time password (OTP) authentication procedure is described. A dedicated validation appliance receives a one-time password authentication request via an application programming interface, which is a single point of access to the dedicated validation appliance. The dedicated validation appliance then determines a validity of the request based on the correlating of a submitted OTP against OTP values independently generated by the dedicated validation appliance based on a large secret key exclusive to a client device that initiated the request. The single point of access to the dedicated validation appliance as well as exclusive sharing of the secret key with only another dedicated validation appliance or one-time with the client device reduces the likelihood of attackers discovering the secret keys.

18 Claims, 11 Drawing Sheets

100

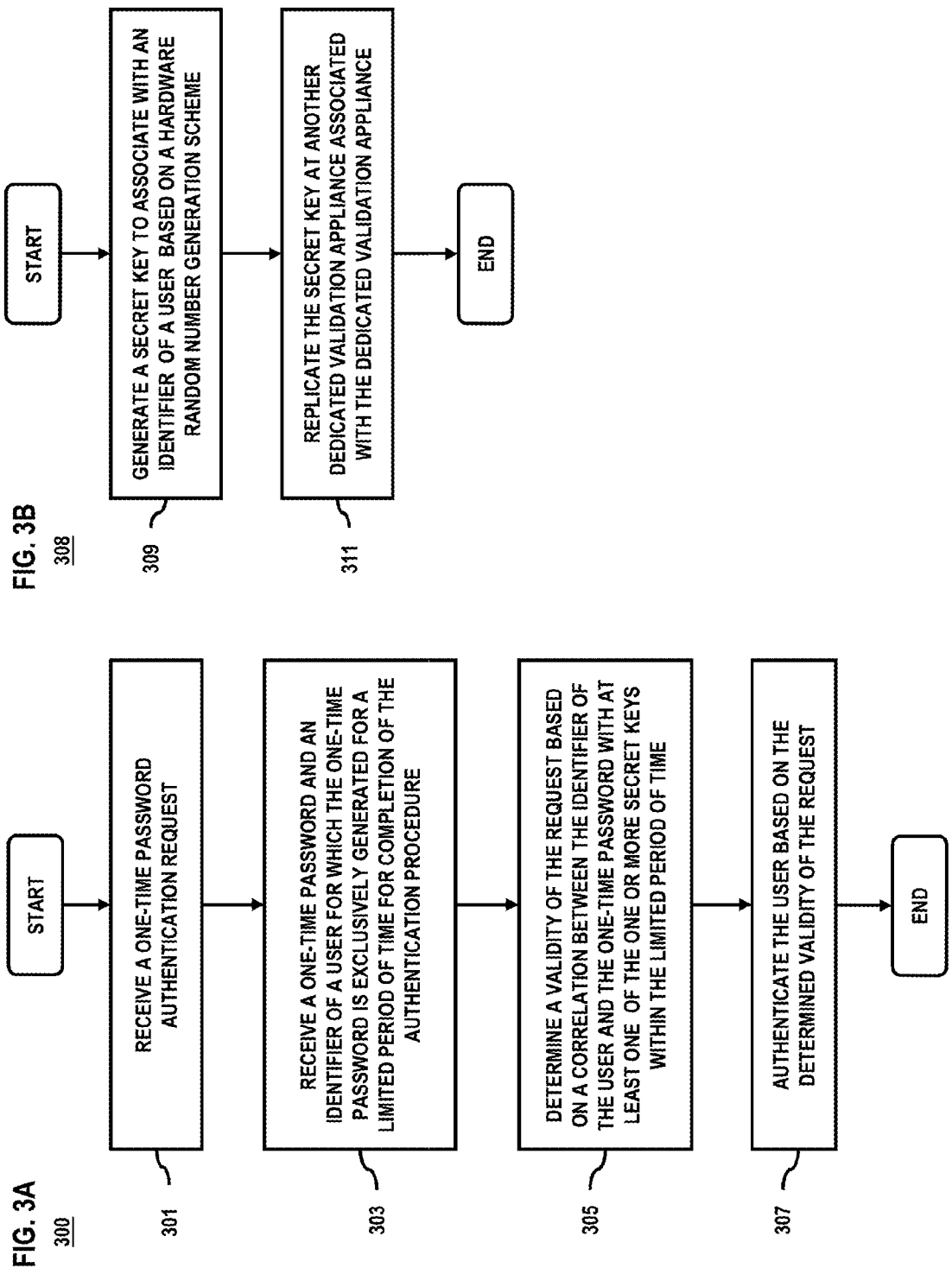

316

312

METHOD AND SYSTEM FOR ENABLING SECURE ONE-TIME PASSWORD AUTHENTICATION

BACKGROUND INFORMATION

Service providers and enterprises are continually challenged to deliver value and convenience to consumers and employees by providing compelling network services and advancing the underlying technologies. Many such network services depend critically upon robust, secure authentication systems and techniques for use by requesting client devices. One-time password (OTP) methods provide a common approach to user authentication, especially in enterprise contexts, and are often combined with other user verification elements to form multi-factor authentication systems. The concept of a shared secret key is central to common OTP systems. Typical OTP systems require the generation of a unique secret key for each end-user. In addition, the user's secret key must be installed on a device in the possession of the user for the purpose of generating a sequence of OTPs that are unique to the user. In order for the authentication system to perform validation of the one-time passwords entered by the users, an inventory of all the users' secret keys must be maintained on the server side, whether in the authentication system itself or within an adjunct OTP validation service. Unfortunately, the authentication system or adjunct OTP validation service could be vulnerable to attacks and hack attempts. The authentication system may be compromised in instances where the attacker is able to access the inventory of secret keys assigned to different users of requesting client devices. The authentication system would be similarly compromised if the attacker could, by any means, anticipate, deduce or predict the secret keys assigned to users; or if the attacker could intercept a user's secret key while it is in transit to the end-user during an initialization or provisioning phase.

Based on the foregoing, there is a need for an effective user authentication system that includes measures to restrict access to its inventory of authentication secret keys.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A-3D are flowcharts of a process for facilitating a one-time password (OTP) authentication procedure, according to various embodiments;

DESCRIPTION OF THE PREFERRED EMBODIMENT

An apparatus, method and software for facilitating a one-time password (OTP) authentication procedure are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to one-time password authentication systems, it is contemplated that these embodiments have applicability to any data protocols, methodologies or systems for provisioning, accessing or activating one or more resources in a secure, time sensitive manner.

Figure 1:
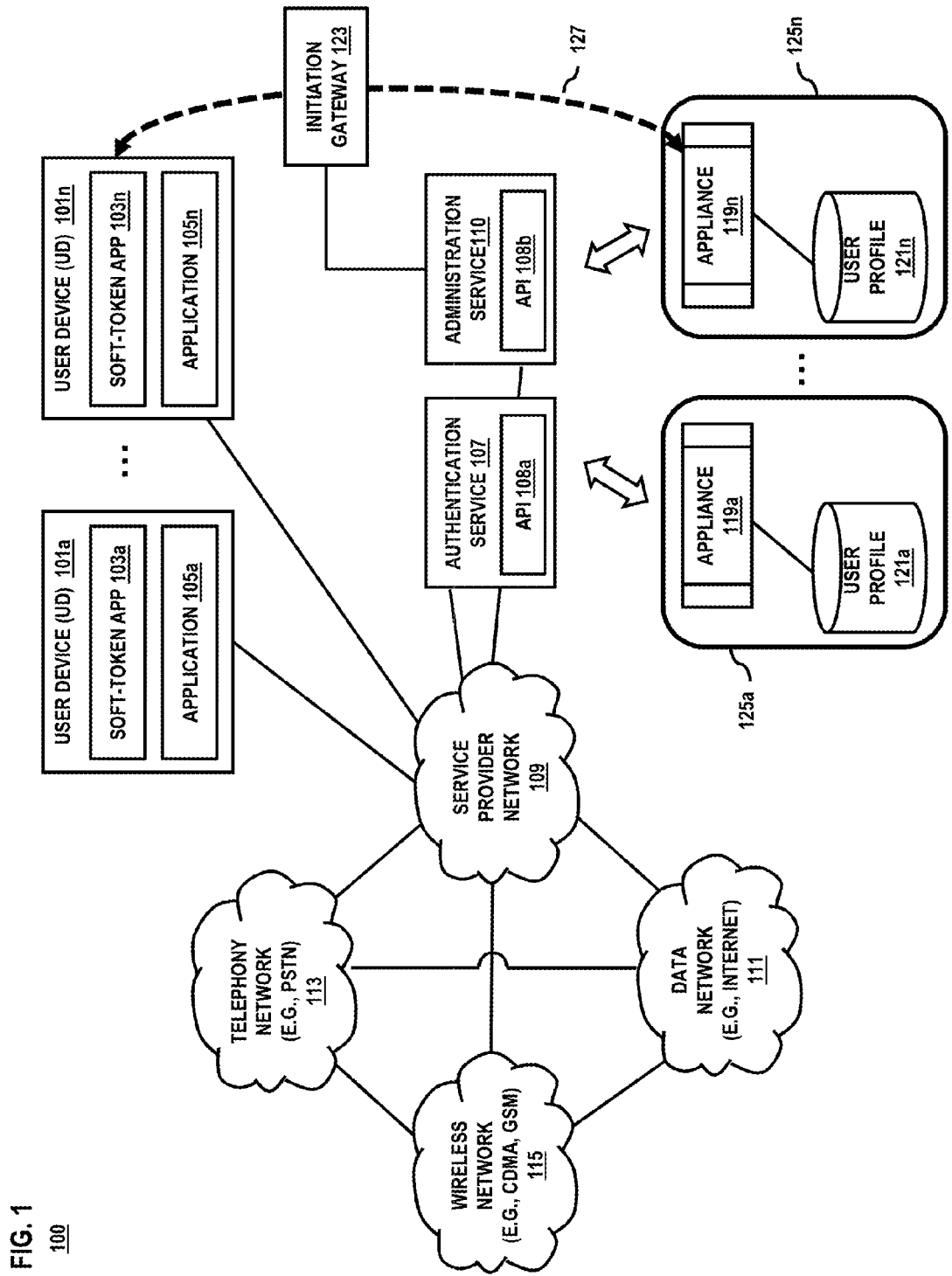
FIG. 1 is a diagram of a system for facilitating a one-time password (OTP) authentication procedure, according to one embodiment.

FIG. 1 is a diagram of a system for facilitating a one-time password (OTP) authentication procedure, according to one embodiment. For the purposes of explanation, system 100 is shown to include one or more user devices 101a-101n (e.g., mobile device, smart phone, netbook, laptop or any communications enabled computing device). The user devices 101a-101n (referred to herein collectively as user device 101) are configured to communicate with an authentication service 107 for initiating an authentication procedure. In certain embodiments, the authentication procedure is based on a one-time password (OTP) model, wherein a single value, device instance and/or contextual condition (e.g., time period) is fulfilled to permit authentication of a requesting user or device. Under this scenario, the authentication procedure may be performed in connection with a resource the user devices 101a-101n require access to or use of. By way of example, the resource may include an internal website or database of an enterprise, a software application, a network communication channel, a server or computing device, etc.

As mentioned previously, typical authentication systems require the user of a requesting user device to enter a password via the authentication service to facilitate the authentication procedure. In some instances, the passwords are conveyed to the user via a dedicated hardware "key fob" device issued to them by a third-party vendor or directly by a provider/owner (e.g., an enterprise) of the resource requiring authentication. Alternatively, the password may be conveyed to the user via a software utility for generating a seemingly random integer of digits. Once this password is entered, the authentication system determines whether it matches the value expected for that user and/or requesting client device during a defined time window (e.g., 10 minutes).

Such approaches to authentication depend upon the back-end authentication function and system maintaining an inventory of shared user profiles, wherein each user profile specifies at least a secret key (unique to the user), a very large, random serial number (SN) unique to the user's soft-token application and a unique identifier of the user. The authentication function also contains one or more cryptographically secure hash functions which map (secret-key, clock-time) pairs onto OTP values that are in effect for the indicated user at the specified time. Clock times may be fairly granular, i.e., measured in minutes relative to some reference time point. As such, the OTP values are virtually indistinguishable from random values and effectively unpredictable given that a cryptographically secure hash function is used. Per this approach, the security of the authentication system need not depend upon the cryptographic algorithm of the hash function being kept secret. Rather, the integrity of the authentication system rests upon the secret key strings remaining secret and being of sufficient length that a guessing attack is not feasible.

Also, the authentication system may allow for successive generations or versions of hash algorithms to be introduced into the system over the lifetime of the system. For example, the system may be implemented to accommodate different users employing different hash functions. In such embodiments, the user profile must contain the quadruplet of secret key, serial number (SN), user identifier and identification of the hash function version in order that the proper algorithm be run when authenticating a specific user. In such an OTP system, the end-user's device employs the secret key and hash function algorithm (which are embedded in the client OTP program) along with the clock time to generate a sequence of seemingly random one-time password values; with a new OTP value refreshing the display periodically. During user authentication, the user passes the current displayed OTP value to the authentication service. The user's claim of identity can then be validated on the server side by looking up the user profile for the claimed user identity and applying the same hash function to that user's secret key and the current server clock time. To allow for user device clocks and server clocks not being precisely in-sync, the authentication procedure may further allow some grace in time by running the hash computation for the user for several time values centered about the current server clock time (e.g., specify clock times as an integral number of minutes past the beginning of a current epoch).

The user authentication succeeds if any of these several hash values within the grace time window match the OTP value the user submitted. Hence, in the case of a match, this serves as validation that the user is in possession of a device containing the correct secret key. Such authentication systems often augment this OTP technique (where the user proves they possess something) with entry of a secret personal identifier that allows the user to prove they know something an attacker would not know. The combination of these factors help ensure security under circumstances where a client device is stolen or misplaced by the authentic user.

While the approaches described above are helpful, the authentication system may still be subject to breach. One such instance is when the random number generator (which is used to generate the user secret keys) is compromised, thus enabling an attacker to deduce the generated keys and achieve "advantage" in a secret key guessing attack. In addition, the authentication system can be compromised in instances where the attacker gains access to the inventory of secret keys assigned to different users. Unfortunately, developing an authentication mechanism that facilitates a time and password sensitive authentication scheme while preventing breaches by inside and outside attackers is not readily achieved by current systems.

To address this issue, system 100 presents a network of dedicated validation appliances 119a-119n for generating and/or maintaining the user profiles 121a-121n required to generate authentic one-time passwords (OTPs) for facilitating an authentication request. As discussed above, each user profile 121a-121n may specify at least the user identifier, a large serial number, the user's secret key and in some instances, the hash function algorithm version that the user's client device or program employs. The dedicated validation appliances 119a-119n, referred to herein collectively as appliances 119, may be implemented as computing devices, embedded controllers or the like. In addition, the appliances 119 may feature a communication interface for interacting with one another to perform specific authentication functions. Still further, the appliances 119 may interact with an authentication service 107 and administration service 110 for carrying out a limited set of authentication and/or device administration functions respectively in connection with a calling service or user device 101.

By way of example, the appliances 119 may be configured to expose a requesting service or user device 101 to only a narrow set of functions dedicated to the specific mission of one-time password validation (e.g., per the authentication service 107). Validation of the one-time password may be further based upon validation of a secret key as associated with a given user profile 121. Still further, a limited set of functions may be exposed for appliance configuration and management (e.g., per the administration service 110). It is noted that highly constrained access to the functions and features of appliances 119 prevents the likelihood of inside or outside breach of the system 100, including access to the inventory of user profiles 121 (including secret keys) maintained by the appliances 119. Hence, the highly constrained access pertains to network, physical and access restrictions imposed upon or by the appliances 119. Under this scenario, proprietary, third-party, internal and/or external systems and devices are also limited in their exposure to the inventory of user profiles.

As another example, the highly constrained access also applies to means for eliminating conventional user login sessions. This includes, for example, login attempts associated with standard computer operating systems such as Windows, Linux, OS X or the like. Moreover, the appliances 119 are configured such that conventional login sessions at either an ordinary user level of privilege or at a "super user" or "root" level of privilege are restricted. Rather, the narrow set of functions exposed by the appliance's remote interface includes no operations that support discovery of the inventory of secret keys.

As another example, the highly constrained access pertains to a limited means of sharing, exchanging, looking up or accessing the inventory of user profiles 121 via a communication network (e.g., service provider network 109). This is the case even by persons and/or systems directly associated with the resource or provider/owner thereof for which authentication is required. Still further, per system 100, the storing and sharing of user profiles is limited to only a select few devices at a time; namely at a user device 101 or one or more dedicated validation appliances 119. The one-time passwords (OTPs) generated based on the secret keys—i.e., per a hash function—are valid for only a limited period of time, further reducing the applicability of a given OTP for performing authentication.

Still further, the appliances 119 are only able to share the inventory of user profiles 121 (including secret keys) among themselves to serve the purpose of keeping the appliances' information stores in-sync with one another. However, other entities in the environment, even an enterprise authentication system (107) that makes use of the appliances 119, are not able to obtain user profiles 121 via the functions exposed in the appliance interface. Precautions are taken (e.g. challenge/response handshakes) to ensure no entity in the environment that is not a validation appliance 119 is able to impersonate an appliance 119 and trick one of the actual validation appliances into divulging user profiles 121. The appliance function invoked by the authentication server 107 is restricted to a request for validation that a user identifier-to-OTP pair is valid for the specified user and one-time password at the given time period when the request is made. As will be discussed further later on, the only exchange of a secret other than between appliances 119 is during a one-time soft-token application 103 initialization procedure.

As another example, the constrained access requirement of the appliances 119 pertains to the physical maintenance of the appliances 119. For example, the appliances may be deployed throughout a facility at disparate locations of an enterprise. Furthermore, the appliances may be housed in a secured room or cage (i.e., barrier 125a-125n). This imposes a physical constraint for limiting access to the inventory of user profiles 121a-121n and the secret keys contained therein as maintained by the appliances 119. This also limits the ability of attackers to reverse engineer an appliance or introduce an imposter appliance into the network for intercepting user profiles 121.

It is noted that various additional safeguards may be employed by different enterprises for use in connection with the highly constrained access features described above. This may include, for example, the implementation of various different delivery protocols or policies. In one example, the enterprise may require that appliances 119 be deployed and configured based on customer, department, geography, or characteristic/type specific challenge/response handshaking mechanism. Hence, a custom handshaking protocol implemented for the Region 1 network of appliances would differ from that of the Region 2 network of appliances. This customization at different levels of granularity would therefore further contain breaches to a single customer, department, geography, etc., thus assuring attacks do not affect the network of appliances as a whole.

Based on the above described constraint and security approaches, it is noted the appliances 119 facilitate restricted access to the user profiles 121 for specifying the secret keys while the keys are at rest (e.g., as stored within one or more appliances 119) or while the keys are in motion (e.g., as a secret key is in transit to a user device 101 for activating a soft-token application 103 of a device 101).

In one embodiment, the appliances 119 operate in connection with the authentication service 107 to authenticate a requesting user device 101 and/or user. The authentication may include, for example, validation of a one-time password originating from the end-user by comparing it with candidate one-time passwords generated by the appliance 119 according to the secret key and hash function stored in the applicable user profile 121. For the purpose of illustration, the authentication service 107 may be implemented as a web service, hosted application or other module accessed over the network 109 for handling authentication requests. Requests may be submitted to the authentication service 107 by way of an application 105a-105n (referred to herein collectively as application 105) of a user device 101. Also, the application 105 may be a browser, web portal or other utility for pointing a user to a network location of the authentication service 107. As such, the user may enter a Uniform Resource Locator of the authentication service 107 into the application 105 in connection with a user login procedure, resource provisioning procedure, resource access procedure or other scheme requiring authentication. Alternatively, the application 105 may call for execution of the authentication service 107 via the device 101 operating system.

The authentication service 107 may be provided by a third-party vendor or directly by a provider/owner of the resource for which authentication is required (e.g., an enterprise). As will be discussed more fully later on, the authentication service 107 need only have access to an application programming interface (API) 108a for communicating with the appliances 119 regardless of whether the service 107 is a direct or third-party solution. Moreover, the appliances 119 may be physically distributed throughout an area defined by the provider/owner of the resource, such as one or more secure data centers. Distribution of appliances 119 may correlate to the distribution of various network nodes and devices within a premise (enterprise) of the provider/owner. For example, the distribution scheme for the appliances 119 may be to accommodate mobile authentication across different departments and/or group locations within a facility of an enterprise, a geographic region, etc.

In certain embodiments, the appliances 119 may be configured to interact with the authentication service 107 via a network, i.e., service provider network 109. For example, the appliances may communicate with each other via secure, encrypted channels to ensure their data (e.g., user profiles) is synchronized. Replication of data amongst the mesh of peer appliances 119 enables robustness against failures as the appliances 119 back up the data to each other and allows the authentication service 107 to be scaled to any required volume of OTP validation requests. Hence, data exchange is significantly privatized as the sharing of secret data (e.g., user profiles 121 and associated secret keys) is limited to the mesh of appliance 119 peers and not specific people, services or institutions. This ensures that a trust relation is established among the mesh of appliance peers (machines) rather than based upon people.

In another embodiment, the appliances 119 may also be configured to operate in connection with an administration service 110. The administration service 110 provides a limited network and user interface for enabling a provider/owner of the resource to configure and maintain the network of appliances 119. By way of example, the administration service 110 enables the provider/owner to add new appliances, remove appliances, power down specific appliances or other functions. It is noted the administration service 110 may render a user interface to a computing device (not shown) of the provider/owner for presenting the aforementioned administrative tasks as different selection options.

In addition, the administration service 110 also presents various selection options for facilitating deployment and initialization of a soft-token application 103a-103n. By way of example, the deployment pertains to delivery and storing of the soft-token applications 103a-103n at respective user devices 101a-101n. The initialization procedure facilitates secure activation of the soft-token applications 103a-103n (referred to herein collectively as applications 103), wherein the activation includes uploading of a secret key specific to the application. The soft-token applications 103 are software utilities configured to present OTPs the user may enter at the authentication service 107 based on an authentic secret key for the requesting user and/or user device 101. Deployment of the soft-token application 103 for installation at a user device 101 may be fulfilled via push technology, email, physical mailing of the software or other means.

By way of example, the soft-token application 103 is distributed with a serial number encoded into the executable software file but without being armed with a secret key value a priori. As such, a default or estimated secret key value cannot be determined by an unauthorized user of a soft-token application 103. Once installed at a user device 101, however, the soft-token application 103 interacts with an initiation gateway 123 to engage in a secure dialog with one of the appliances 119 to conduct the one-time initialization procedure. As noted above, the initialization pertains to arming of the soft-token application 103 with a secret key value specific to the given user for enabling subsequent generation of one-time password sequences at the user device 101 (locally). In addition, in cases where the authentication service 107 supports multiple generations of hash algorithms, the initialization procedure may include loading of the hash algorithm to be employed for generating OTPs. Hence, it is noted that during initialization, the secret key and/or hash algorithm is shared between the soft-token application 103 and at least one of the appliances 119—e.g., the appliance within a certain physical or network proximity of the user device 101.

During initialization, the soft-token application 103 passes (via the initiation gateway 123) a user identifier along with the assigned serial number of the application 103 to the appliance 119. This exchange may correspond to a handshake procedure between the application 103 and the appliance 119. Upon receipt of the user identifier and serial number, the appliance 119 cross-references the user identifier and/or serial number (of the application 103) against user profile data 121 maintained for the user to determine (per the user identifier) which soft-token applications 103 (per the serial number) has been provisioned with a specific secret key value. The initiation gateway 123 serves as an additional mechanism (device layer) for brokering the initialization interaction and credential exchange between user devices 101 and appliances 119.

The initialization handshake happens over a Transport Layer Security (TLS) encrypted session (or similar secured, private channel), thus ensuring no person can eavesdrop on the handshake protocol exchange. During this initialization handshake, the end user may enter their user identifier into the soft-token application user interface. The soft-token device then transmits this data along with the embedded SN to the appliance 119. Upon receipt, the appliance then looks up the user profile 121 associated with the specified user identifier and verifies the SN stored in that profile matches the SN which the soft-token application communicated. If the SN values match, the appliance 119 sends the user's secret key to the soft-token application 103, thus facilitating successful "arming" of the application 103.

The privacy of this exchange is critical for ensuring no attacker, whether insider or outsider, can intercept the user's secret key during transit. For example, in the case of an end-to-end TLS session (or similar end-to-end secured channel), the TLS secured transport could be layered over other secured transports (e.g., IPsec based virtual private network (VPN) session). Such details can depend upon how the user's device 101 is connected to the corporate or provider network at the time when the soft-token application 103 is armed. In the case where the user device is connected directly to a corporate LAN during the initialization handshake, the TLS session could be layered directly over TCP/IP, and need not necessarily be mediated by the initiation gateway 123. Alternatively, the user might be located remotely during the initialization process and connect to their corporate network over a VPN connection that is already available to them. Under this scenario, the secured TLS session could be "riding" over an IPsec-based VPN session which also provides its own encryption. In such scenarios, there would be two layers of encryption.

The appliances 119 generate user profiles 121, which in turn supports execution of the above described initialization procedure. For the purposes of illustration, generation of a user profile 121 for indicating a secret key may be carried out by at least one appliance within the network as follows: (i) create a large random serial number (SN) to be uniquely associated with that user's soft-token application; (ii) create a large random secret key to be associated with that user; (iii) choose a hash algorithm to be used during all OTP generation and validation operations for that user; (iv) store the user identifier, SN, secret key and hash algorithm identifier as a data record for maintenance as a user profile for the user and to be stored on the appliance; and (v) create a custom executable code instance to embody that user's soft-token application program, wherein the customization is comprised of embedding the unique SN into the executable program (but not the user identifier), as well as embedding the hashing algorithm to be employed for that user.

In certain embodiments, the system 100 accommodates different enterprise level network access schemes, including those where OTP authentication is required to access a virtual private network (VPN) prior to activation of the soft-token application 103 for enabling the authentication. For such a scenario, the soft-token application may still be securely armed with a secret key while the user is connected remotely to the corporate or provider network over the Internet as follows: if the user is remote and does not have VPN access, the initiation gateway 123 generates a VPN-like private communication channel for executing initial exchange. The private channel is transient such that it is generated for the specific user one-time and only for the duration of the secret key exchange protocol. As such, the user profile 121 for specifying the serial number, user identifier and secret key are transmitted over the private channel, i.e., via a tunneling protocol, between the appliance 119 and the soft-token application 103 requiring initialization by the initiation gateway 123. This transient connection 127 is depicted, by way of example, as dashed line 127.

It is noted the transient connection 127 as mediated by the initiation gateway 123 can be based on any known means of tunneling data over an IP based network. As in the case of ordinary VPN access, the communication procedure from client to proxy would be encrypted point-to-point (this is in addition to the end-to-end encryption of the TLS session being tunneled). However, the transient connection 127 may be implemented in a VPN-like manner—i.e., the connection is limited for the duration of the initialization exchange and no other session is allowed to commence in association with the same serial number. In one embodiment, the appliance 119 that generates the unique SN for that user's soft-token application would add the SN to a sort of "job" list of outstanding soft-token applications that remain to be initialized ("armed"). Thus when the transient connection 127 is set up via the initiation gateway 123, the gateway verifies with the appliance 119 that the SN sent from the user device 101 is on this "job" list.

If the SN is not featured on the list, the transient connection 127 is terminated by the initiation gateway 123. If the SN is featured on the job list, however, the transient connection 127 proceeds such that the soft-token application 103 may carry out the initialization handshake with the appliance 119. Upon completion, the SN may also be removed from the "job" list, thus ensuring further attempts to impersonate the requesting soft-token application 103 cannot be engaged. This approach ensures that the transient connection 127 for enabling an initialization session is one-time only. In addition, an "aging" mechanism is incorporated per automatic removal of the SN values from the "job" list in cases where the initialization does not commence within a prescribed time limit. This further ensures that soft-token application activation tasks that are abandoned do not leave stale data in the system.

The VPN-like access session—i.e., as facilitated per the transient connection 127—is distinguished from traditional VPN communication as the initiation gateway 123 need only direct traffic from the user to one specific appliance address. This is in contrast to traditional VPN communication, wherein the remote client can send packets through the VPN gateway to virtually any destination IP address that would be available to the client in instances where the client is connected locally rather than remotely.

As an additional security feature, in certain embodiments, the soft-token application 103 installed on the user device 101 need not be provided the IP addresses or DNS names of the validation appliances 119 (e.g. the soft-token application could possess only a pseudo/dummy address for the appliance). In such embodiments, the initiation gateway 123 may perform a network address translation, ensuring the packets from the application 103 get forwarded to one of the validation appliances 119 (rather than the dummy address) during the initialization protocol exchange. This approach obscures the actual addresses of validation appliances 119 themselves from the user devices 101, which are only provided information for connecting with the initialization gateway(s) 123. Furthermore, such an approach ensures a "rogue" soft-token application 103 (modified by an attacker) cannot communicate with any device in the corporate or provider network other than the validation appliance 119.

In certain embodiments, once the soft-token application 103 is initialized, no further secret key exchange is required. Furthermore, no additional communication between an appliance 119 and the requesting soft-token application 103 commences. Rather, the soft-token application 103 is able to process the secret key (as armed) via the hash function to enable the generation of OTPs. OTPs are generated periodically, with the periodicity being established as a parameter during implementation or configuration of the authentication service 107 (e.g., rollover every 60 seconds). For the purpose of illustration, this period of time corresponds to an approximate time-of-use of the OTP, wherein the time also permits a grace window to allow for clock variances between a user device 101 and the appliance 119. Information for indicating the time-of-use may be presented by the soft-token application 103 along with the OTP to indicate the time remaining before another OTP value is to be generated and presented. By way of this approach, the time frame for presentment of the OTP value via the soft-token application 103 may also be employed as a variable for authenticating the password and/or user device (as discussed more fully later herein).

In certain embodiments, the above described functions of the appliances 119 are exposed to the calling authentication service 107 and/or administration service 110 by way of application programming interfaces (APIs) 108a and 108b respectively. The APIs 108a and 108b may include one or more instructions for initiating and/or calling a specific function. By way of example, the API 108b may include instructions for calling and/or executing the initialization process per the administration service 110 or other configuration options. As another example, the API 108b may include commands for enabling the powering down, rebooting or synchronizing of appliances 119. Under this scenario, the administrative functions may be activated to remedy a performance or operational malfunction, accommodate expansion or contraction of the network of appliances 119 or the like. For the above described approach, all communications between the calling service (e.g., the authentication service 107, administration service 110 or initiation gateway 123) and the appliance 119 may be carried over a secure encrypted channel, such as that provided by a TLS session.

As noted, the API 108a may also be called upon by the authentication service 107. Under this scenario, when a user enters a one-time password at the user interface of the authentication service 107, the service 107 calls upon the API 108a to submit a request to an appliance 119 for performing one-time password validation. By way of example, the API 108a submits a signal to the appliance 119 via a controlled communication channel. In response, the appliance 119 verifies (e.g., YES or NO) whether a specific OTP value for a specific user identity is valid for the requesting user at the time at which the API function is called. This includes determining whether the OTP corresponds to a user profile 121, and especially a secret key and hash algorithm pair for the user. In addition, the determination includes validating whether the current timing information is within the allowed period of time for performance of the authentication—i.e., a number of discrete clock times centered about the authentication service 107 clock time are attempted to be matched. Hence, it is noted the validation result is based on multiple variables/factors being determined valid concurrently, namely clock time and user identity. This time-limited authentication approach serves to prevent replay attacks. Furthermore, as mentioned previously, the basic OTP authentication technique can be combined with additional authentication factors, including user entry of a personal identifier at the user interface of the authentication service 107 or through the providing of biometric data related to the user.

In one embodiment, the appliances 119 generate secret key values (with which the user soft-tokens are "armed" during the initialization phase discussed above) based on a true or hardware-based random number generator. The random number generator (not shown) may be implemented as an executable component of each of the appliances 119, which is called upon by an appliance 119 per the initialization procedure. The hardware-based generator (true generator) is employed by the appliances 119 as opposed to a software-based pseudo random number generator (PRG), which may be susceptible to guessing or partial derivation of the generation algorithm by an insider. As mentioned previously, if an attacker is aware of the PRG algorithm employed for generating secret keys and was able to steal the key used by a company or security provider to seed the PRG, the attacker would gain knowledge of the set of secret keys. As such, even if the attacker did not know the precise order in which the pseudo-random generated secret keys were doled out to specific users, the attacker would be able to realize an advantage beyond what would be statistically expected in a blind guessing attack. In the case of a hardware based scheme, however, random values used for generating secret keys can be generated based on random analog processes occurring in nature. This may include, for example, Johnson thermal noise, shot noise, junction noise or the like, which may be generated by one or more processors.

By way of example, one technique for random value generation is to amplify Johnson thermal noise in a resistor and capture analog signal values with some form of sample and hold technique. Another option may be to capture the signal output of unstable inverter circuits, wherein the output serves as the generated secret key. It is noted the appliances 119 may employ numerous different random value generation and cryptographic approaches, all of which provide a level of unpredictability/randomness in generation of secret keys. Of note, the random values obtained through random analog processes occurring in nature, as mentioned above, could be further conditioned (e.g. to remove bias) by passing the random values through well-known software Key Derivation Function (KDF). Secret key values as generated are shared between the appliances 119 periodically for synchronization purposes and with the user device (one-time) for initialization purposes.

In certain embodiments, new appliances are added to the network of existing appliances 119 via a bootstrapping procedure. Under this scenario, the operations staff associated with the resource to be authenticated or the appliances 119 only know the MAC address of the appliance hardware a priori. By way of example, the new appliance is first assigned an internet protocol (IP) address. This is accomplished by temporarily connecting a configuration device, such as a bootstrapping computer (not shown), to the appliance via an Ethernet cable or other connection means. The bootstrapping computer executes an installation utility program that communicates directly with the appliance 119 at the data link layer via the appliance's 119 Media Access Control (MAC) address. By way of example, the communication can be carried out between the bootstrapping computer and the new appliance via point-to-point protocol/Ethernet (PPP). The utility program also allows administration credentials to be established for the new appliance as required for enabling the above described administration functions via the remote API 108*b*.

After initializing the appliance's IP address, various known procedures can be employed to register the host in the domain name server (DNS) of the provider/owner of the resource. During the bootstrapping process, the appliance also generates a certificate-signing request (CSR) file, which is transmitted to the calling utility program for creation of an X.509 certificate by a third-party certification authority (CA). Once created, the certificate may then be uploaded to the new appliance via the utility program, thus readying the appliance for validation and/or recognition by the other appliances and for secure TLS communication to be established. It is noted that the certification serves as a precursor to enabling secure communication between the newly added device and the existing network. This tightly controlled bootstrapping process also allows a new validation appliance 119 to be made operational in the corporate or provider network environment without customary administrator login at the operating system level.

The existing appliances 119 are informed of the addition of a new appliance peer by way of a notification message being sent to the existing devices. In certain embodiments, the notification is invoked through execution of the API 108*b* of the administration service 110, wherein the API 108*b* invokes a remote appliance joining function. In response, the existing appliances 119 and the new appliance instance establish a secure TLS communication and through a challenge/response handshaking procedure, confirm the new appliance is a valid addition to the network. This challenge/response validation prevents a process or device other than a genuine validation appliance from acting as an imposter and spoofing the appliances into sharing secret key values with the imposter. As such, this validation enables the store of shared user profiles 121 to be replicated from the existing appliances 119 to the new appliance accordingly. It is noted the above described configuration procedure is executed without an ordinary operating system level administrative login action.

In certain embodiments, the appliances 119 further interact with the administration service 110 to prevent the theft of a user's soft-token application 103 by way of various approaches. For example, in addition to entry of a PIN as mentioned previously, an alternative PIN approach is to require the user to enter their PIN into the user interface of authentication service 107 along with the OTP read off of the soft-token 103 display. As another example, the application 103 may time out after a predetermined period of inactivity of the application or the user device 101, thus providing an additional means of thwarting unwarranted access. As another example, the administration service 110 may provide a secure web interface, including the requirement of the user to enter a credential, for enabling the user to perform the initial download of the application 103 to their device 101. Still further, the administration service 110 may employ a single-sign-on (SSO) access scheme for enabling application access.

In either case, the administration service 110 may facilitate communication with a requesting user device 101 via a transient connection 127, thus minimizing the likelihood of interception of the application 103. The transient connection and sign-in-procedure introduces an additional layer of security for facilitating the deployment/transmittal of the software in its physical or digital form.

In certain embodiments, a security scheme may be employed to mitigate unwarranted access to a soft-token device or application code intercepted by an adversary while in transit (e.g., via mail) to a legitimate user. Under this scenario, a third-party activation scheme may be employed wherein a first user (e.g., manager or supervisor of an enterprise that owns the resource to be accessed) initiates provisioning of the soft-token application 103 on behalf of a second user (e.g., employee of the enterprise). The administration service 110 provides the first user with a one-use password then stores that one-use password in the user profile (within the appliances) corresponding to the second user. The first user can then relay the one-use password to the second user via an "out-of-band" communication mechanism, e.g., a phone call. When the second user (e.g., employee) first launches their soft-token application 103, it requests entry of the one-use password. Once provided, the one-use password entered by the user is processed to determine if it matches the originally generated one-use password that was stored in the given user's profile in relation to the first user. When a match is determined and the secret key is transferred from the appliance 119 to the application 103 per the aforementioned initialization procedure, the application 103 becomes activated.

Based on the above described approach, an attacker that intercepts the physical medium containing the application 103 will not possess the one-time use password. Consequently, the attacker would not be able to activate the application 103 even though they may physically possess it. Also, various other highjack prevention, theft prevention and secure soft-token application 103 delivery approaches may be employed accordingly.

It is noted that user devices 101*a*-101*n* may be any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), smartphone or any combination thereof. It is also contemplated that the user devices 101 can support any type of interface for supporting the presentment or exchanging of data. In addition, user devices 101*a*-101*n* may facilitate various input means for receiving and generating information, including touch screen capability, keyboard and keypad data entry, voice-based input mechanisms and the like. Any known and future implementations of user devices 101 are applicable.

In certain embodiments, user devices 101, the appliances 119 and other elements of system 100 may be configured to communicate via a service provider network 109. According to certain embodiments, one or more networks, such as data network 111, telephony network 113, and/or wireless network 115, can interact with the service provider network 109. Networks 109-115 may be any suitable wireline and/or wireless network, and be managed by one or more service providers. For example, telephony network 113 may include a circuit-switched network, such as the public switched telephone network (PSTN), an integrated services digital network (ISDN), a private branch exchange (PBX), or other like network.

Networks 109-115 may employ various technologies for enabling wireless communication including, for example, code division multiple access (CDMA), long term evolution (LTE), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Still further, the communication provider network may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, the communication network 113 may embody or include portions of a signaling system 7 (SS7) network, Internet protocol multimedia subsystem (IMS), or other suitable infrastructure to support control and signaling functions.

It is noted, though not shown in the figure, that in certain embodiments user devices 101 may be configured to establish peer-to-peer communication sessions with each other using a variety of technologies, including near field communication (NFC), Bluetooth, ZigBee, infrared, etc. Also, connectivity can be provided via a wireless local area network (LAN). By way of example, a group of user devices 101 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each user device 101, i.e., IP addresses that are accessible to devices connected to the service provider network 109 as facilitated via a router.

Figure 2:
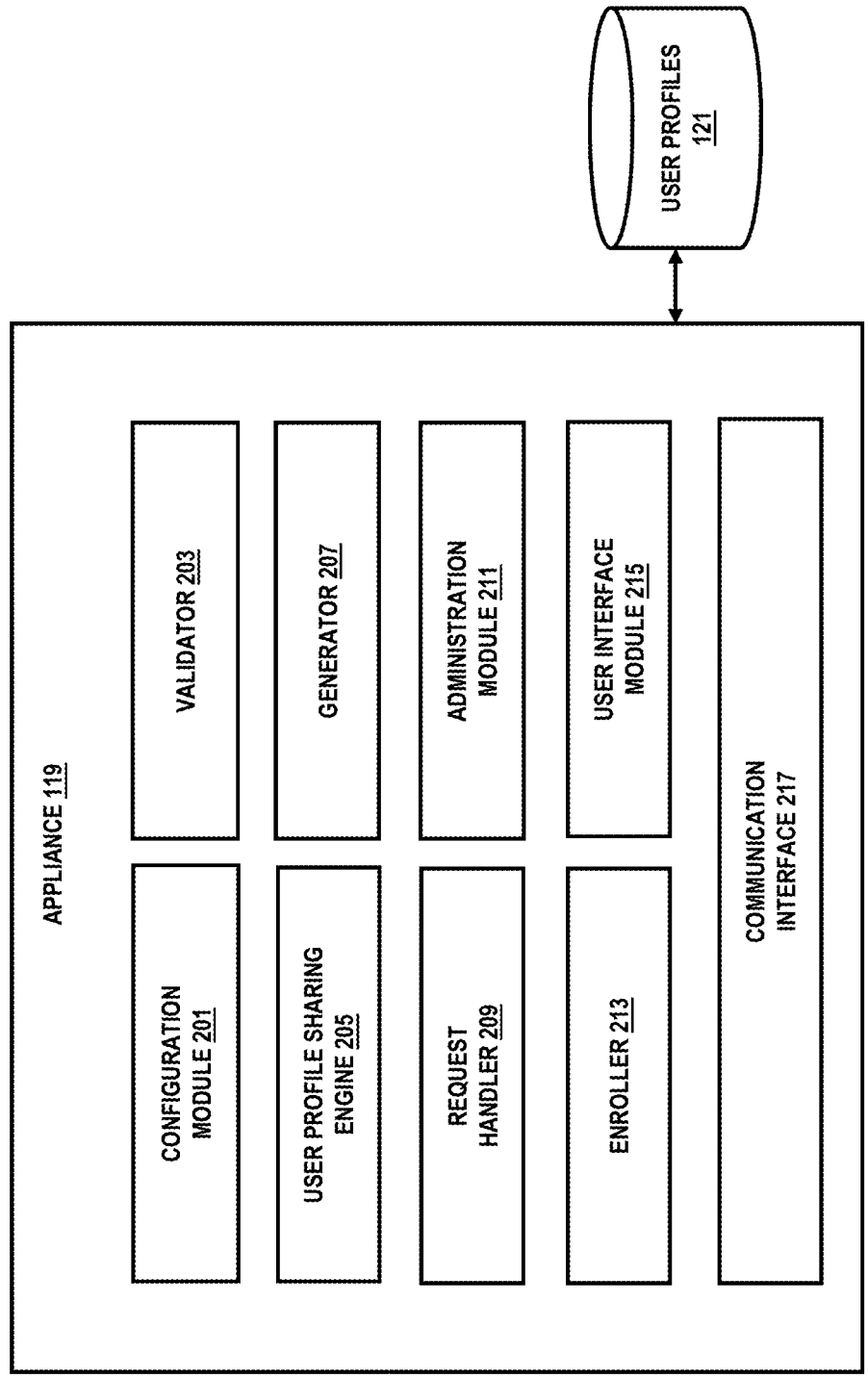
FIG. 2 is a diagram of the components of a dedicated validation appliance, according to one embodiment.
Figure 3D:
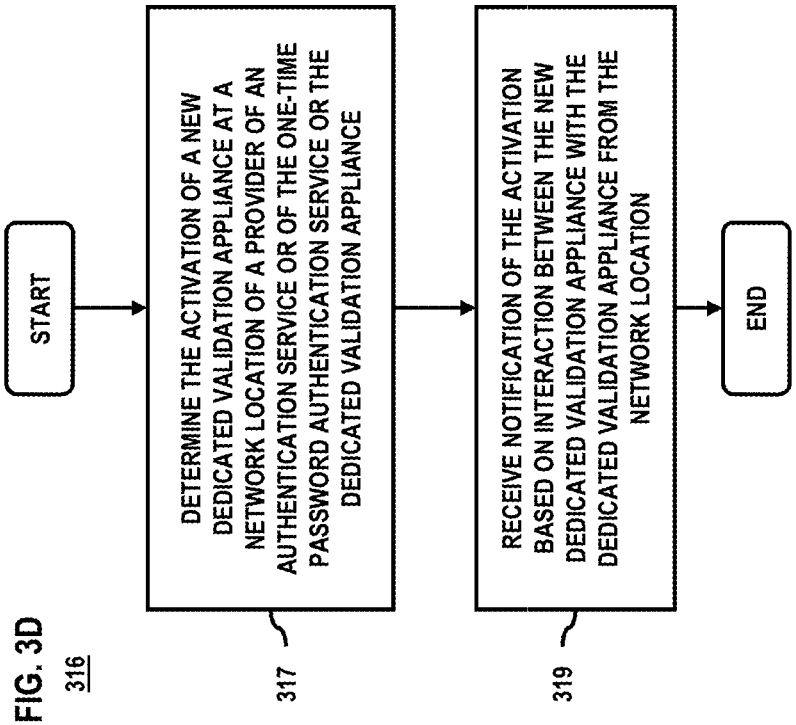
Figure 3C:
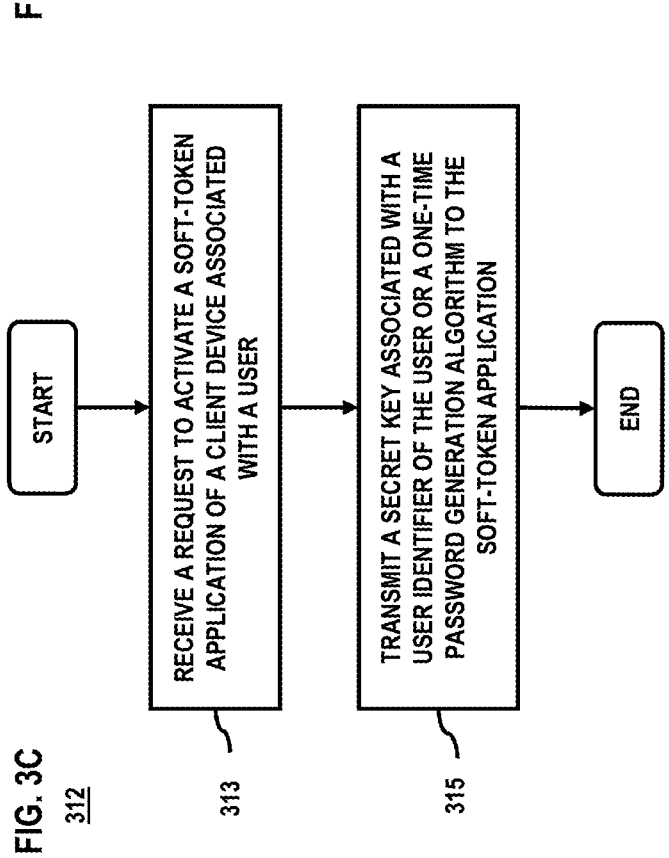

FIG. 2 is a diagram of the components of a dedicated validation appliance, according to one embodiment. The dedicated validation appliance, or appliance 119, includes various executable modules for facilitating a one-time password (OTP) authentication procedure. Such modules can be implemented in hardware, firmware, software, or a combination thereof. By way of example, the appliance 119 may include a configuration module 201, validator 203, user profile sharing engine 205, generator 207, request handler 209, administration module 211, enroller 213, a user interface module 215 and communication interface 217.

In addition, the appliance 119 also maintains a data store 121 for maintaining the inventory of user profiles required to perform validation of an OTP entered via the authentication service 107. Each secret key may also specify or be associated with a cryptographically secure hash function and user identifier, such as in connection with a user profile.

In one embodiment, the request handler 209 interprets application programming interface (API) requests as received from the authentication service 107 and the administration service 110. The requests are generated by the API 108a and 108b, via a calling service, for specifying calls for execution of specific functions of the appliance 119. Hence, the functions include those to be performed by the various other components of the appliances 119. By way of example, the requests are received by the communication interface 217, which serves as a single point-of-access (constrained access) to the appliance 119 for enabling administrative or authentication actions.

When a request/call is received via the communication interface 217, it passes the request to the request handler 209. The request handler 209 then interprets the request type and initiates execution of the administration module 211. The administration module 211, in certain embodiments, processes the input/variables specified per an administration request and subsequently executes a command function or protocol based on the input. By way of example, a request to power down the appliance 119a as interpreted by the request handler 209 may be correlated with a "void powerDown ( )" appliance 119 command function of the administration module 211. As another example, a command function of "void restart ( )" of the administration module 211 may be correlated by the request handler 209 with a request to restart the appliance 119. As another example, the command function "boolean wipeClean ( )" may be correlated with a request to clear all data stored by an appliance 119 and set the appliance's state to essentially what it was when first received from the vendor before being made operational. It is noted the above described requests are initiated from a user interface rendered by the administration service 110.

Requests for specifying authentication related command functions may also be interpreted by the request handler 209. For example, when a user enters a one-time password at the authentication service 107—as specified via a soft-token application 103—the request handler 209 correlates this with a validation request. In response, the request handler 209 forwards the password entry to the validator 203, which in turn validates the one-time password along with other variables. By way of example, the validation request may correlate to a "boolean isOnetimePasswordValidForUser(String userId, String tokenValue)" command function executed by the validator 203, wherein the tokenValue string input corresponds to a value of the OTP. Under this scenario, the validator 203 determines whether the OTP and user identifier submitted as string inputs per the validation request match the secret key. The matching is performed based on a cross-referencing of an expected OTP value from the given user identifier against a corresponding user profile 219 data record.

Still further, the validator 203 performs a check to determine if the OTP is still active for the limited authentication time period. This check is performed based on timestamp information associated with the request, a time period for enabling authentication and time of use information associated with the OTP. In addition to limiting the period of usefulness of a generated OTP, the authentication time period also enables a window or grace period for instances where the clocks of the requesting device(s) and appliances are not precisely synchronized.

It is noted the validator 203 determines the validity of multiple variables/factors concurrently. In certain implementations, the validator 203 may be an executable component resident at an appliance 119, i.e., as a set of appliance instances running in one or more of the resource provider/owner's data centers. Alternatively, the validator 203 may be resident in appliances 119 that are hosted in a security service provider's cloud environment, and accessed from the customer's authentication systems as a remotely called service to the cloud. Under this scenario, a cloud-based solution for performing the validation at the location of the provider/owner of the resource to be authenticated is called. The latter approach may be useful in cases where the provider/owner already runs other systems, such as the authentication service 107 or administration service 110 as hosted solutions.

In one embodiment, the configuration module 201 facilitates the bootstrapping of appliances 119. The bootstrapping procedure pertains to the adding and activating of new appliances to an existing network of appliances for enabling secret key generation and sharing accordingly. By way of example, the configuration module 201 operates in connection with the communication interface 217 to detect the attaching of a bootstrapping computer to the appliance 119. The connection may be detected by way of a port of the appliance 119 for supporting an Ethernet cable connection or other means. As such, the bootstrapping computer may execute an installation utility program that communicates directly with the appliance 119 at the data link layer via the Ethernet connection. Per interaction of the configuration module 201 with the utility program an IP address may be set for the appliance 119 along with establishing an entry for a domain name server of the provider/owner of the resource to be authenticated.

The configuration module 201 also enables a provider/owner of the appliance 119 to establish administrative credentials for the appliance 119. This may include, for example, activating the appliance such that it may interact/interface with an administration service 110. In addition, during the bootstrapping procedure, the configuration module 201 generates a certificate-signing request (CSR) file and sends this to the utility program at the bootstrapping computer. Under this scenario, the administrator (e.g., associated with the provider/owner of the resource) can request an X.509 certificate from a certification authority, then upload the generated certificate to the appliance via the bootstrapping computer.

The configuration module 201 also informs the existing appliances 119 that a new appliance device has been configured. This may include, for example, directing a notification message or user interface signal to the various other appliances via the user interface module 215. By way of example, the configuration module 201 may call upon the user interface module 215 to render a web-based configuration interface to the existing appliances 119. Alternatively, the notification may be invoked remotely, via the administration service 110, or programmatically by invoking the API call (e.g., "boolean newPeerJoining(String dnsName, String ipAddress))." In this example function, the DNS entry and IP address are provided as inputs/variables for invocation of the command.

Once this call is made, the existing appliances 119 and new appliance establish a secure communication channel via transport layer security (TLS). The configuration module 201 then facilitates a challenge/response handshaking procedure to confirm the new appliance is a valid addition to the existing network of appliances. By way of example, the handshaking procedure may include use of a challenge/response protocol. The configuration module 201 then initiates replication of the store of user profiles 121 at the existing appliance to the new appliance 119. Of note, the configuration module 201 may also facilitate the removal of appliances from the existing network/mesh of appliances when necessary, including decoupling of the IP address, removal of the DNS entry, erasure/wiping of the store of secret keys, etc.

In certain embodiments, the enroller 213 facilitates installation and activation of soft-token applications 103 at a user device 101. This execution is performed in conjunction with the administration module 211 and initiation gateway 123. By way of example, the enroller 213 facilitates deployment of the soft-token application 103a-103n, such as by way of push technology. Also, the enroller 213 maintains a record of the serial number encoded within the soft-token application 103 as well as engages the initiation gateway 123 to facilitate initial arming/activation of the soft-token application 103 upon request. Under this scenario, the enroller 213 facilitates a handshaking procedure between the soft-token application 103 and an appliance to provide the secret key for arming of the application. This may include cross-referencing of a provided user identifier and serial number of the soft-token application against user profile 121 data records for identifying a corresponding secret key and/or hash algorithm to provide to the soft-token application 103. Once identified, the enroller 213 submits the secret key to the soft-token application 103 via the initiation gateway 123.

In certain embodiments, the serial number is a unique, long, random-appearing number as generated via execution of the generator 207. The generator 207 is configured to generate user profiles, including a secret key, according to a hardware based random value generation scheme. In addition, the generator 207 may further employ various output conditioning techniques for generating the inventory of secret keys 121. Operating in connection with the generator 207 is the user profile sharing engine 205, which is triggered to enable the user profile and secret keys contained therein to be exchanged with the other appliances comprising the network, i.e., those that are not involved in the initialization procedure.

As this data is exchanged, the enroller 213 also records an identifier associated with the user (user identifier), the assigned serial number of the soft-token application as well as the secret key. This corresponds to an updating of the user profile 121 data records across all appliances 119. By way of this approach, the enroller 213 is able to maintain accurate details regarding the various user devices 101 equipped to generate authentic OTPs based via the user profile sharing engine 205. It is noted that the enroller 213 may facilitate updating of the user profile 121 after successful completion of the handshaking procedure with the soft-token application 103 for confirming its activation.

In one embodiment the user interface module 215 enables presentment of a graphical user interface in response to application programming interfaces (APIs) corresponding to the various modules of the appliance 119. As such, the user interface module 215 permits rendering of various graphics primitives and media elements to a display in connection with a given command. In addition, the user interface module 215 may generate an administration interface for displaying the various administrative functions of the administration module 211. In certain embodiments, the administration interface may be activated directly by the user interface module 215 in lieu of the administration service 110 or may operate in tandem with the administration service 110 for affecting appliance 119 operation.

In one embodiment, a communication interface 217 enables formation of a session over a network 109 between an appliance and the administration service 110 or the authentication service 107. Also, the communication interface 217 may facilitate a limited, one-time communication with a soft-token application 103 via the initiation gateway 123 during the initialization phase of the soft-token application 103. The session may be generated in connection with a user profile sharing engine 205, such as to enable the transmission of user profiles 121 amongst appliances. Alternatively, the session may be initiated by the enroller 213. By way of example, the communication interface 217 executes various protocols and data sharing techniques, including virtual private networking, secure peer-to-peer communication and the like. It is noted that the communication interface 217 supports only a limited set of communications as exposed via select API functions. Hence, the communication interface may further interact with the request handler 209 for receiving API 108 requests accordingly.

Figure 6:
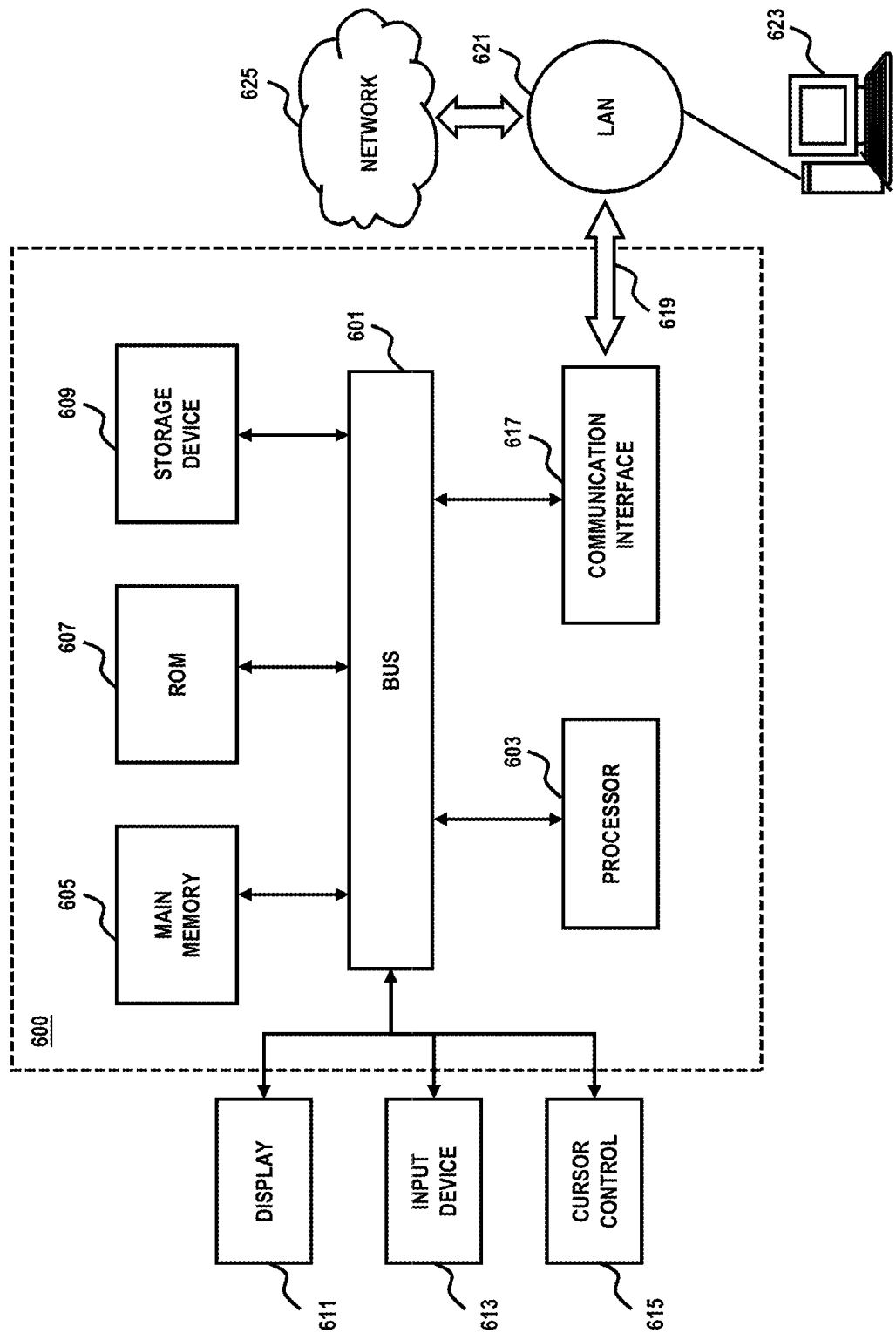
FIG. 6 is a diagram of a computer system that can be used to implement various exemplary embodiments.
Figure 7:
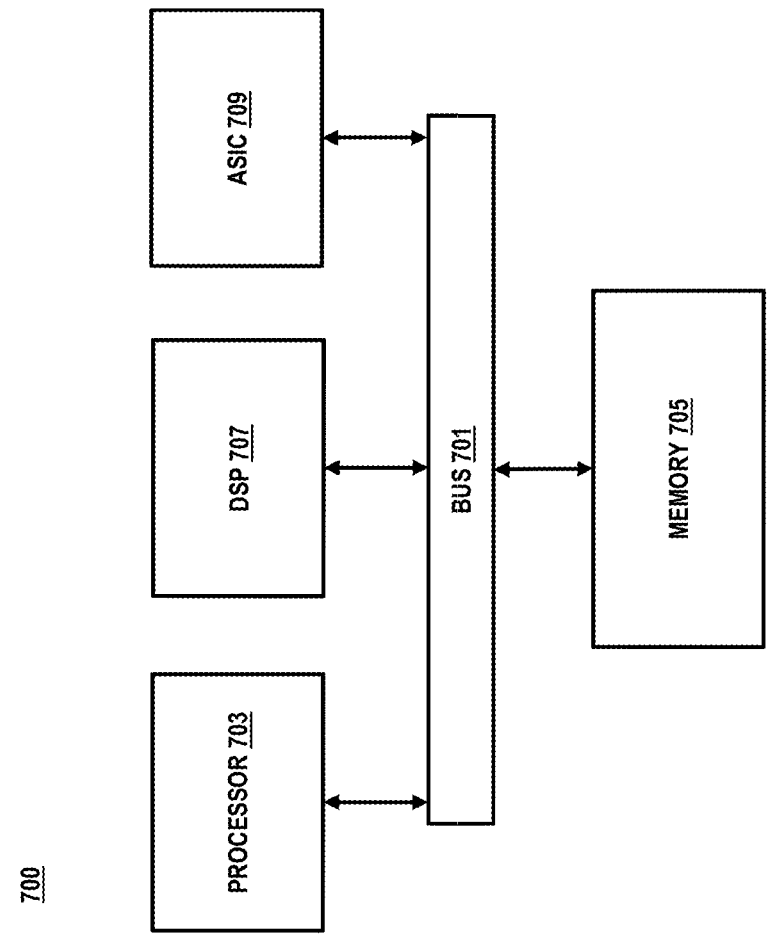
FIG. 7 is a diagram of a chip set that can be used to implement an embodiment of the invention.

FIGS. 3A-3D are flowcharts of processes for facilitating a one-time password (OTP) authentication procedure, according to various embodiments. In one embodiment, processes 300, 308, 312 and 316 are implemented in, for instance, a chip set including a processor and a memory as shown in FIGS. 6 and 7. Also, in one embodiment, the dedicated validation appliances 119 interact with the various elements of system 100, including the soft-token application 103 and various services 107 and 110 to facilitate execution of the processes.

In step 301, the dedicated validation appliance 119 receives, via an application programming interface, a one-time password authentication request. The application programming interface (API) is a single point of access to the dedicated validation appliance for maintaining one or more secret keys. As noted previously, the secret keys may be associated with user profile data for specifying a corresponding user identifier and/or hash algorithm to which the secret key is associated. It is noted also that the user profile may specify a serial number that is associated with a soft-token application resident at a client device of the user corresponding to the user identifier.

In step 303, the dedicated validation appliance receives, per the request, a one-time password and an identifier of a user for which the one-time password is exclusively generated for a limited period of time for completion of the authentication procedure. Per step 305, the dedicated validation appliance 119 determines a validity of the request based on a correlation between the identifier of the user and the one-time password with at least one of the one or more secret keys within the limited period of time. As noted previously, the limited period of time corresponds to a limited duration/window of opportunity for the user to perform authentication of a resource.

In step 307, the dedicated validation appliance 119 authenticates the user based on the determined validity of the request. As mentioned, the authentication may be facilitated by way of an authentication service 107, which is configured to receive user provided input for initiation of an authentication request. By way of example, the authentication service 107 may present the user with an interface for enabling entry of the one-time password. The user may also provide their user identifier as input to the interface for correlating their limited time-of-use password with their user identifier. The time-of-use may be a time period before generation of an updated one-time password but before expiration of the limited time period for completion of the authentication procedure. Of note, the embodiments described herein may be performed in connection with any known or developing authentication services and techniques accordingly.

In step 309 of process 308 (FIG. 3B), the dedicated validation appliance 119 generates a secret key. The secret key is generated based on a hardware random number generation scheme. By way of this approach, the secret key is as random and unpredictable as naturally occurring phenomenon. Also, while the identifier may be a user identifier in certain embodiments, it may also be a device identifier, customer identifier or service identifier associated with the user.

In step 311, the dedicated validation appliance 119 replicates the secret key as generated at another dedicated validation appliance associated with the dedicated validation appliance. Under this approach, each appliance 119 is synchronized for maintaining the inventory of secret keys. The synchronization also includes replication of the associated hash algorithms and user identifier values associated with the inventory of secret keys (e.g., full user profile synchronization). As noted previously, the dedicated validation appliance and the other dedicated validation appliance communicate with each other via a secure peer-to-peer communication channel.

Per step 313, the dedicated validation appliance receives a request to activate a soft-token application of a client device associated with a user. As noted previously, the activation corresponds to a one-time initialization procedure between the requesting soft-token application and an appliance. In another step 315, the dedicated validation appliance 119 transmits a secret key associated with a user identifier of the user or a one-time password generation algorithm to the soft-token application. The secret key and/or the one-time password generation algorithm (e.g., hash algorithm) are used to generate a one-time password to be presented via the soft-token application in association with a time-of-use of the one-time password.

In step 317 of process 316 (FIG. 3D), the dedicated validation appliance 119 determines the activation of a new dedicated validation appliance at a network location of a provider of the one-time password authentication service or the dedicated validation appliance. As noted previously, activation of a new validation appliance in the operational network environment may proceed in two main stages. The first stage corresponds to a direct Ethernet connection to a bootstrapping computer (communicating with the appliance at the data link layer via the appliances' MAC address), wherein the appliance is assigned an IP address and additionally initialized with a DNS name and an X.509. By way of this configuration/activation means, the appliance is enabled to be active on the enterprise or provider network. The second stage corresponds to a secure exchange between an existing appliance (if any) and the new appliance once the new appliance is operational on the network. Per this approach, a handshaking procedure or challenge/response protocol is employed such that the new appliance can validate it is a legitimate validation appliance and not an imposter.

Once this challenge/response verification completes, the existing appliance can then share its inventory of user profiles with the new appliance, whereupon the new appliance becomes a fully functioning member of the mesh of peer validation appliances. Per step 323, the dedicated validation appliance receives notification of the activation based on interaction with the new dedicated validation appliance from the network location.

It is noted that the dedicated validation appliances are distributed throughout an area defined by a provider of the authentication service and/or throughout a network of the provider of the one or more dedicated validation appliances. As a security measure, each of the appliances are maintained in a secured container or secured room. By way of this approach, as well as the limited means of interaction with the appliances 119, the inventory of user profiles are not able to be breached even by attackers directly employed by and/or associated with the provider/owner of the resource requiring authentication.

Also, as noted previously, the dedicated validation appliances 119 feature no logins for access by internal and/or external users. Hence, with no ordinary logins to an appliance 119, even an administrator or super user associated with the provider/owner of the resource cannot gain entry to the appliance 119 for accessing the inventory of user profiles and the secret keys contained therein. Still further, the appliances 119 are configured to adhere to a strict, limited vocabulary of interactions with only the administration service, the authentication service, the initiation gateway, the soft-token applications (one-time) or each other through API calls.

Figure 4A:
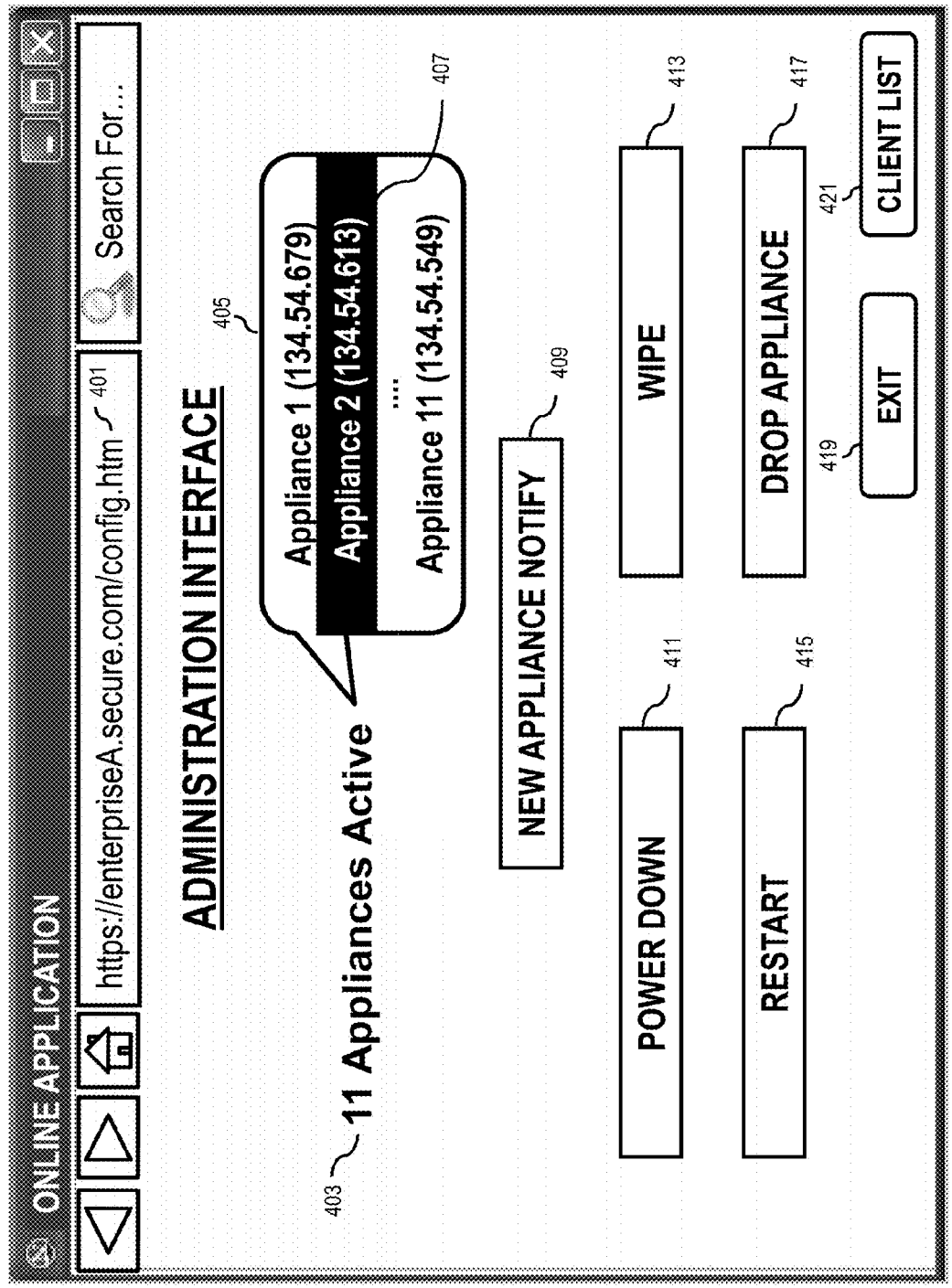
FIG. 4A is a diagram of a user interface for managing one or more dedicated validation appliances, according to one embodiment.

FIG. 4A is a diagram of a user interface for managing one or more dedicated validation appliances, according to one embodiment. For the purpose of illustration, the diagrams are described with respect to an exemplary use case of an enterprise having several dedicated validation appliances deployed throughout a facility. The enterprise employs an administration service 110 for managing its appliances, which provides an interface 400 for enabling various administration features.

In FIG. 4A, the administration interface 400 is accessed by way of a browser application. The browser accepts as input a pointer or uniform resource locator for accessing the administration interface 400 via a network. In this example, the location corresponds to a secure internal network location of the enterprise corresponding to the location of the administration service 110. It is noted, however, that the administration interface 400 may be generated directly by an appliance, i.e., via a web server configured to the appliance.

The administration interface 400 presents various action buttons 409-417 for invoking an administrative feature of the one or more appliances. Each action button corresponds to an API call that is transmitted to the appliance, i.e., via a web services interface. In addition to the action buttons 409-417, the interface 400 also presents a listing 405 and a count 403 of the appliances actively deployed by the enterprise within the facility. By way of example, a user (e.g., administrator of the enterprise) may highlight/select one or more of the appliances within the list 405 to specify which appliances are to be affected through selection of one or more of the action buttons 409-417. Hence, under this scenario, when Appliance 2 at the IP address location of 134.54.613 is highlighted within the list 405 (e.g., as list entry 407), only this appliance is affected by the corresponding administrative functions.

By way of example, when the administrator selects the POWER DOWN action button 411, an API call is submitted to the selected appliance to cause it to power down. As another example, when the administrator selects the WIPE action button 413, an API call is submitted to cause the inventory of user profiles maintained by the selected appliance to be wiped/deleted. The appliance can then be resynchronized with the other appliances accordingly. As yet another example, selection of the RESTART action button 415 causes an API call to be submitted to the selected appliance for shutting it down and restarting it (e.g., reboot).

When the administrator selects the DROP APPLIANCE action button 417, an API call is submitted to disconnect the selected appliance from the existing network of appliances on the list 405. This may include, for example, removing the allocated network location of the appliance as well as removal of the appliance from the listing 405 (e.g., removal from a domain name system (DNS)). Upon removal, the other appliances are also notified of the removal of the selected appliance.

When the NEW APPLIANCE NOTIFY action button 407 is selected, this activates an API call for notifying the other appliances of an addition to the network. This action button 407 may be selected following the bootstrapping procedure of the selected appliance. By way of example, when a new appliance labeled Appliance 12 (not shown) is added and present on the list 407, the administrator selects this button to notify the other appliances. The appliances may then engage in a handshaking procedure with the new appliance as well as a user profile (e.g., secret key) sharing (replication) procedure accordingly.

The interface 400 also presents EXIT and CLIENT LIST action buttons 419 and 421 respectively. By way of example, selection of the EXIT action button 419 enables the administrator to exit the administration interface 400. Selection of the CLIENT LIST action buttons causes a list of current users and/or client devices to be presented (not shown in FIG. 4A). The list may include any devices and associated users that enrolled with the appliances of the enterprise via an initialization procedure. This includes those devices that have installed and activated a soft-token application 103 for generating OTP values to be used in connection with a one-time password authentication procedure.

It is noted that the administration interface 400 is limited to only the specific set of functions as shown via the interface 400. As such, interaction between the administration service 110, a client device of a user, the soft-token application 103 and the appliances are limited to only the API calls provided. Such confined access to the functions of the appliance as well as to the store of user profiles and the secret keys contained therein minimizes susceptibility of the appliances to attack.

Figure 4B:
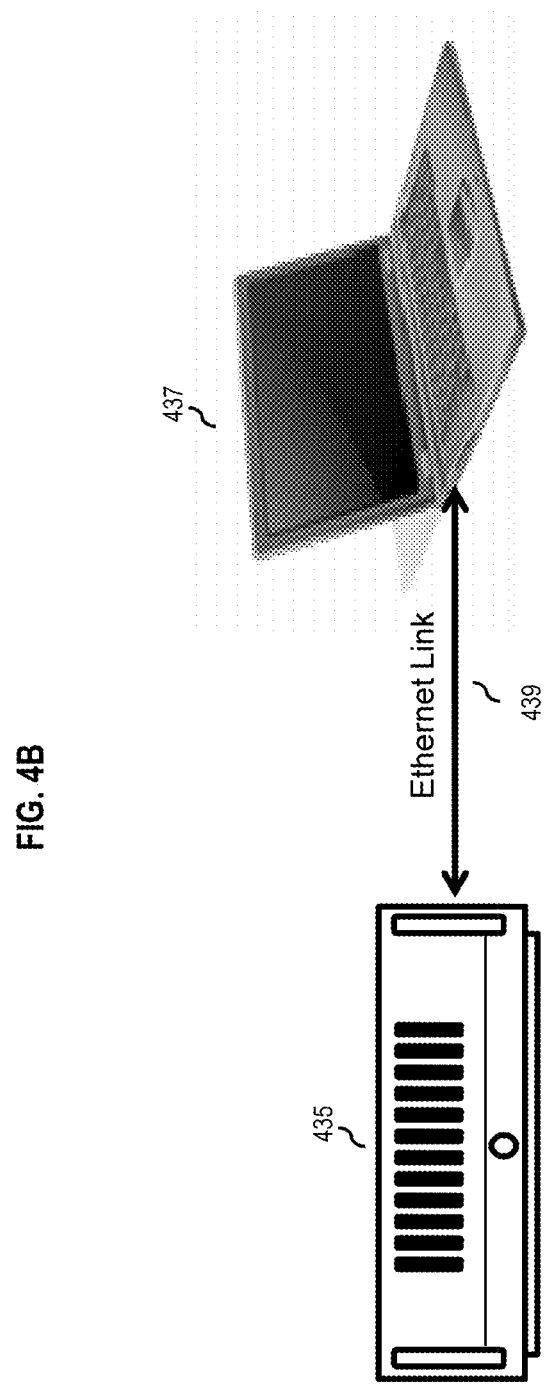
FIG. 4B is a diagram depicting a bootstrapping procedure for configuring a dedicated validation appliance, according to one embodiment.

FIG. 4B is a diagram depicting a bootstrapping procedure for configuring a dedicated validation appliance, according to one embodiment. As noted, the bootstrapping procedure is invoked to enable configuring of a new appliance 435 to an existing network of appliances. To execute the procedure, the new appliance is first assigned an internet protocol (IP) address, which is carried out by a bootstrapping computer 437. In this case, the bootstrapping computer is connected to the new appliance via an Ethernet cable 439 or other connection means. The bootstrapping computer executes an installation utility program that communicates directly with the appliance 119. Again, this confined access minimizes susceptibility of the new appliance to attack or modification—i.e., installment of a patch or execution code that increases the vulnerability of the appliance.

By way of the procedure, the various administration functions described above with respect to FIG. 4A are activated for the new appliance 435. In addition, the new appliance 435 is able to interact with the other appliances to share user profiles and hence secret keys. It should be noted that once the bootstrapping process is completed, and the appliance knows its IP address and DNS name, and the X.509 certificate is installed, the bootstrapping computer can be disconnected from the appliance, and the appliance can be connected to the data center network. At this point, the appliance's ability to communicate via TCP/IP is now activated.

Figure 5A:
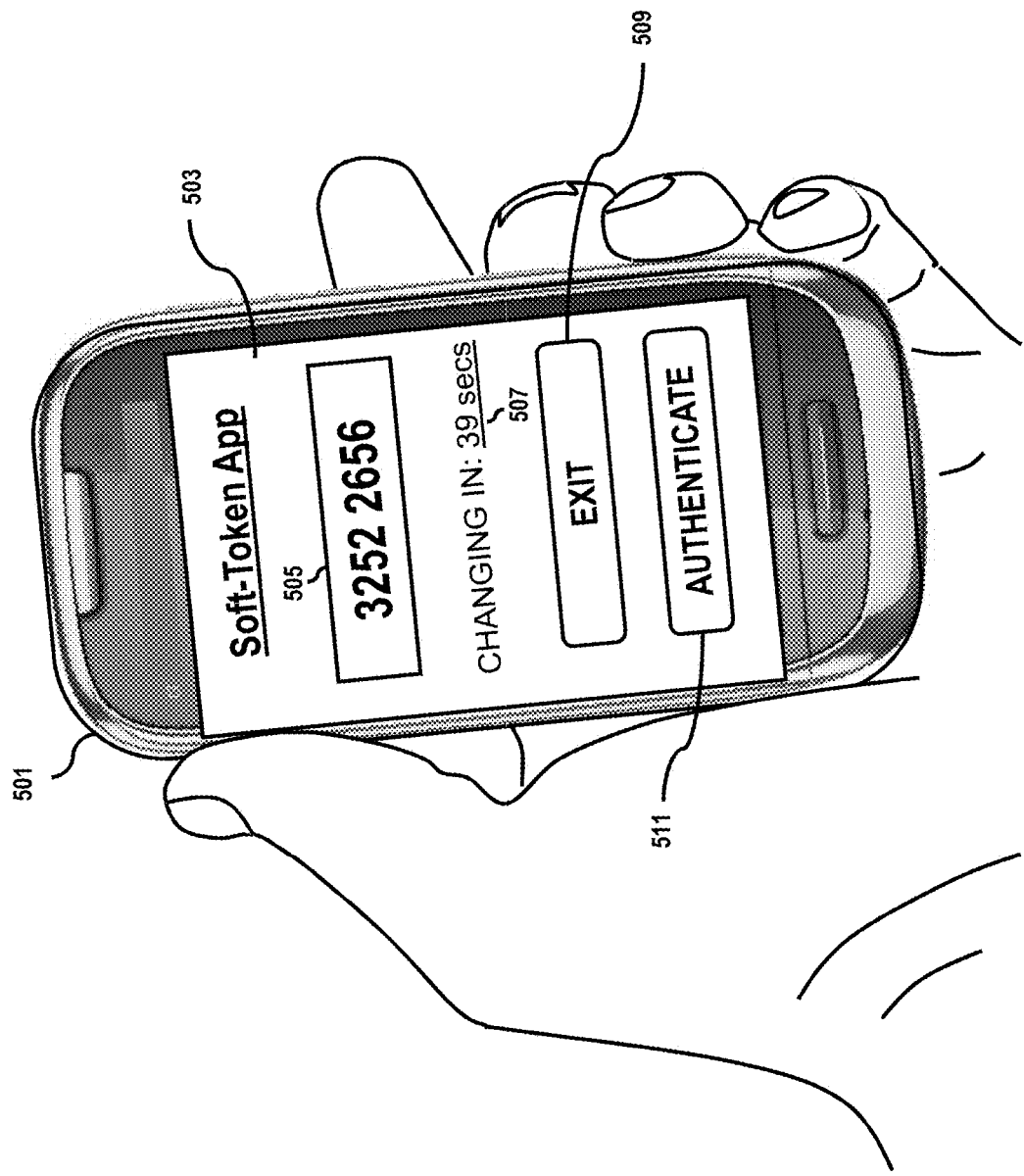
FIGS. 5A-5C are diagrams of user interfaces for executing a one-time password (OTP) authentication procedure via a requesting client device, according to various embodiments.
Figure 5B:
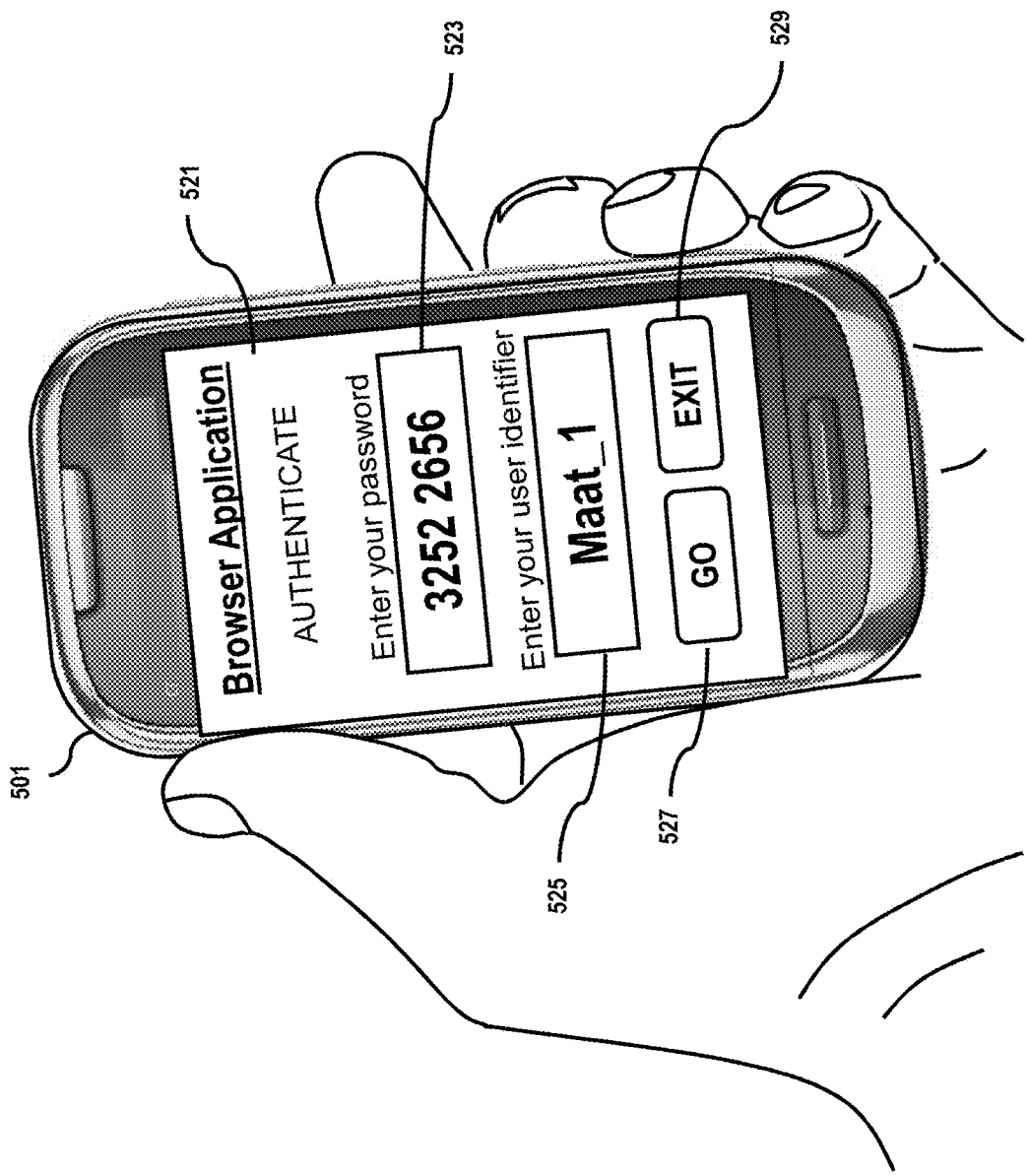
Figure 5C:
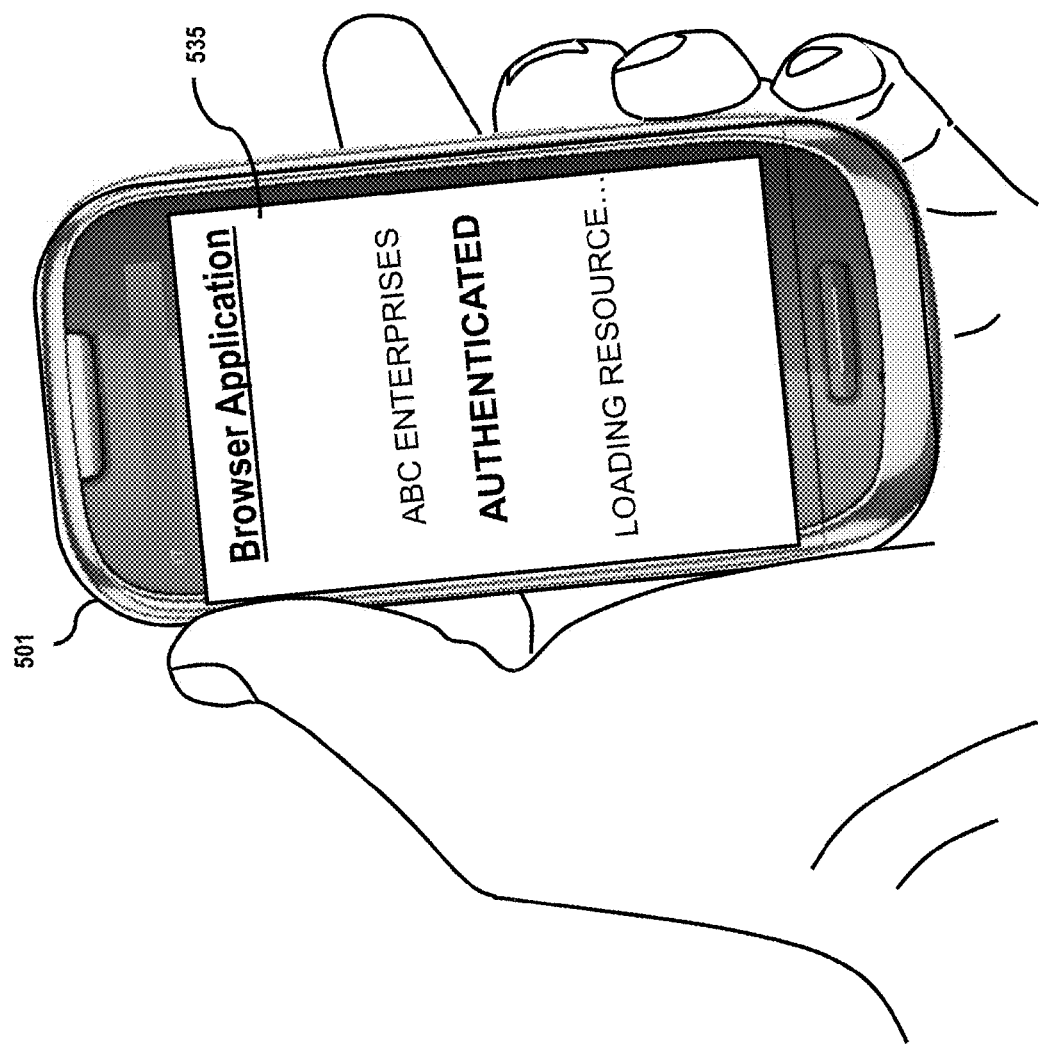

FIGS. 5A-5C are diagrams of user interfaces for executing a one-time password (OTP) authentication procedure via a requesting client device, according to various embodiments. For the purpose of illustration, the diagrams are described with respect to an exemplary use case of an employee of an enterprise (ABC Enterprises) that seeks to access a resource (e.g., a proprietary database) via their mobile device. The enterprise employs several dedicated validation appliances throughout their facility for supporting mobile access to the resource for employees at the facility.

In FIG. 5A, the soft-token application 503 is presented to the display of the mobile device 501 of the employee. Under this scenario, the soft-token application 503 has already been activated at the mobile device 501 per an initialization procedure. As such, the soft-token application 503 presents a password data field 505 for specifying an OTP to be used for performing an authentication procedure in connection with the proprietary database. This data field 505 is generated by the soft-token application of the device 501 based on processing of a secret key via a hash algorithm or other OTP generation scheme. The generation of the one-time password values happens autonomously via the client soft-token application, without any network communication being required between the soft-token application and the appliance instances. The one-time passwords are generated algorithmically on the user device by passing the shared secret key and user device clock-time to the hash function.

Also presented in connection with the password data field 505 is time-of-use data 507. The time-of-use data 507 is presented as a countdown timer for indicating the amount of time remaining before the password changes. Of note, when the time-of-use expires, a new/different password is generated and subsequently presented. The periodicity of generation of a new OTP may be established by the authentication service 107. It is noted that any means of representing the time-of-use may be implemented.

Once the one-time password is acquired (i.e. it has been generated and displayed and the user has entered it into an independent authentication interface), the user may exit the soft-token application 103 by selecting the EXIT action button 509. Alternatively, the soft-token application 503 may feature an AUTHENTICATE action button 511 for launching an authentication service 107 of the enterprise. By way of example, the launch may include invocation of a browser application of the device 501 with a corresponding web address/URL for accessing an interface of the authentication service. The authentication interface 521 is depicted, by way of example, in FIGS. 5B and 5C.

In FIG. 5B, a password entry data field 523 is presented as well as a user identifier entry data field 525. The employee enters the password, as acquired via the soft-token application 503. In addition, the employee enters their user identifier—i.e., an employee identifier, alias, network handle, etc. To exit the browser application and thus end the authentication procedure, the employee can select the EXIT action button 529. To initiate the authentication procedure, however, the employee selects the GO action button 527. It is noted that selection of the GO action button 527 initiates an API call for execution of the OTP value validation procedure by an appliance. The appliance performs authentication based upon validation of: (a) whether or not the OTP 523 matches a candidate OTP value independently generated by the appliance; (b) whether or not the user identifier 525 matches a user profile record; and (c) whether or not the OTP value is still active for the limited authentication time period. This combination of factors enhance the reliability and security of the OTP authentication procedure.

Once the password, user identifier and time variables are validated by the appliance, the authentication procedure is complete. In response, the authentication service renders an authentication confirmation message 535 to the display of the device as depicted in FIG. 5C. Resultantly, the resource subject to the authentication procedure may also be loaded and/or retrieved as a result of successful authentication.

The exemplary techniques and systems presented herein enables a highly secure authentication framework to be employed in connection with one or more resources. As a first advantage, the authentication system is not susceptible to external or internal attack due to highly constrained physical and network access to a group of dedicated validation appliances. As another advantage, the core secret key generation algorithm can be made immune from guessing attacks by using a large secret key size and by employing sophisticated, cryptographically secure hash algorithms that produce unpredictable sequences of generated OTP values. As yet another advantage, the inventory of secret keys and serial numbers of client soft-token instances are generated and maintained only by the dedicated validation appliances, which synchronize their inventories only amongst themselves over secure encrypted communication channels.

The processes described herein for facilitating a one-time password (OTP) authentication procedure may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 6 is a diagram of a computer system that can be used to implement various exemplary embodiments. The computer system 600 includes a bus 601 or other communication mechanism for communicating information and one or more processors (of which one is shown) 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for adjusting cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multiprocessing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g.

for Ethernet™ or an Asynchronous Transfer Mode (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIGS. 5A-5C, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 7 illustrates a chip set or chip 700 upon which an embodiment of the invention may be implemented. Chip set 700 is programmed to facilitate a one-time password (OTP) authentication procedure as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of facilitating a one-time password (OTP) authentication procedure.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to facilitate a one-time password (OTP) authentication procedure. The memory 705 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving, via an application programming interface, a one-time password authentication request, wherein the application programming interface is a single point of access to a dedicated validation appliance for maintaining one or more secret keys, wherein the application programming interface is associated with an authentication service separate from the dedicated validation appliance, wherein the authentication service is restricted from accessing the one or more secret keys;
   receiving, per the request, a one-time password and an identifier of a user for which the one-time password is exclusively generated for a limited period of time for completion of the authentication procedure;
   determining, by the dedicated validation appliance, a validity of the request based on a correlation between the identifier of the user and the one-time password with at least one of the one or more secret keys within the limited period of time; and
   authenticating the user based on the determined validity of the request, wherein the user is associated with a client device for enabling user entry of the one-time password via an authentication service for initiating the authentication.

2. The method of claim 1, further comprising:
   generating, at the dedicated validation appliance, a secret key to associate with an identifier of a user based on a hardware random number generation scheme; and
   replicating the secret key at another dedicated validation appliance associated with the dedicated validation appliance, wherein the dedicated validation appliance and the other dedicated validation appliance communicate with each other via a secure peer-to-peer communication channel.

3. The method of claim 1, further comprising:
   receiving a request to activate a soft-token application of a client device associated with a user; and
   transmitting, based on the request, a secret key associated with a user identifier of the user or a one-time password generation algorithm to the soft-token application, wherein the request is based on a one-time communication procedure between the client device and the dedicated validation appliance.

4. The method of claim 3, wherein the secret key or the one-time password generation algorithm are used to generate a one-time password and the one-time password is presented via the soft-token application in association with a time-of-use of the one-time password.

5. The method of claim 1, further comprising:
   determining activation of a new dedicated validation appliance at a network location of a provider of the one-time password authentication service or the dedicated validation appliance; and
   receiving, at the dedicated validation appliance, notification of the activation based on interaction between the new dedicated validation appliance with the dedicated validation appliance from the network location, wherein the activation is associated with a bootstrapping procedure of the new dedicated validation appliance.

6. The method of claim 5, wherein the activation includes a handshaking procedure or security procedure performed via a secure peer-to-peer communication channel for authenticating the new dedicated validation appliance.

7. The method of claim 1, wherein a plurality of dedicated validation appliances are distributed throughout an area defined by a provider of an authentication service or of the dedicated validation appliance.

8. The method of claim 1, wherein the dedicated validation appliance is maintained in a secured container or secured room.

9. An apparatus comprising:
   at least one processor; and
   at least one memory including computer program code for one or more programs, the at least one memory and the computer program code configured to, with the at least one processor, cause the apparatus to perform at least the following,
      receive, via an application programming interface, a one-time password authentication request, wherein the application programming interface is a single point of access to a dedicated validation appliance for maintaining one or more secret keys, wherein the application programming interface is associated with an authentication service separate from the dedicated validation appliance, wherein the authentication service is restricted from accessing the one or more secret keys;
      receive, per the request, a one-time password and an identifier of a user for which the one-time password is exclusively generated for a limited period of time for completion of the authentication procedure;
      determine, by the dedicated validation appliance, a validity of the request based on a correlation between the identifier of the user and the one-time password with at least one of the one or more secret keys within the limited period of time; and
      authenticate the user based on the determined validity of the request, wherein the user is associated with a client device for enabling user entry of the token value as a one-time password via an authentication service for initiating the one-time password authentication procedure.

10. The apparatus of claim 9, wherein the apparatus is further configured to:
    generate, at the dedicated validation appliance, a secret key to associate with an identifier of a user based on a hardware random number generation scheme; and
    replicate the secret key at another dedicated validation appliance associated with the dedicated validation appliance, wherein the dedicated validation appliance and the other dedicated validation appliance communicate with each other via a secure peer-to-peer communication channel.

11. The apparatus of claim 9, wherein the apparatus is further configured to:
receive a request to activate a soft-token application of a client device associated with a user; and
transmit, based on the request, a secret key associated with a user identifier of the user or a one-time password generation algorithm to the soft-token application, wherein the request is based on a one-time communication procedure between the client device and the dedicated validation appliance.

12. The apparatus of claim 11, wherein the secret key or the one-time password generation algorithm are used to generate a one-time password and the one-time password is presented via the soft-token application in association with a time-of-use of the one-time password.

13. The apparatus of claim 9, wherein the apparatus is further configured to:
determine an activation of a new dedicated validation appliance at a network location of a provider of the one-time password authentication service or the dedicated validation appliance; and
receive, at the dedicated validation appliance, notification of the activation based on interaction between the new dedicated validation appliance with the dedicated validation appliance from the network location, wherein the activation is associated with a bootstrapping procedure of the new dedicated validation appliance.

14. The apparatus of claim 13, wherein the activation includes a handshaking procedure or security procedure performed via a secure peer-to-peer communication channel for authenticating the new dedicated validation appliance.

15. The apparatus of claim 9, wherein a plurality of dedicated validation appliances are distributed throughout an area defined by a provider of an authentication service or a of the dedicated validation appliance.

16. The apparatus of claim 9, wherein the dedicated validation appliance is maintained in a secured container or secured room.

17. A system comprising: one or more dedicated validation appliances for determining a validity of a one-time password authentication request based on a correlation between an identifier of a user and a one-time password with at least one of the one or more secret keys within a limited period of time; an application programming interface for accessing the one or more dedicated validation appliances to initiate the one-time password authentication request, wherein the application programming interface is a single point of access to the one or more dedicated validation appliances and the dedicated validation appliances maintain one or more secret keys, wherein the application programming interface is associated with an authentication service separate from the dedicated validation appliance, wherein the authentication service is restricted from accessing the one or more secret keys, and said one or more dedicated validation appliances authenticates the user based on the determined validity of the request, wherein the user is associated with a client device for enabling user entry of the one-time password via an authentication service for initiating the authentication.

18. The system of claim 17, further comprising:
a bootstrapping device for activating a new dedicated validation appliance at a network location of a provider of the one-time password authentication service or the one or more dedicated validation appliances; and
a soft-token application for interacting with the one or more dedicated validation appliances to present the one-time password at a client device associated with the user as a one-time password in association with a time-of-use of the one-time password.

* * * * *